United States Patent [19]

Ono et al.

[11] Patent Number: 4,572,313
[45] Date of Patent: Feb. 25, 1986

[54] RELAY ARRANGEMENT FOR STEERING WHEEL

[75] Inventors: Satoshi Ono; Hiroshi Sugita; Tetsushi Hiramitsu, all of Aichi, Japan

[73] Assignee: Toyoda Gosei Co., Ltd., Aichi, Japan

[21] Appl. No.: 629,175

[22] Filed: Jul. 9, 1984

[30] Foreign Application Priority Data

Sep. 9, 1983 [JP] Japan ................. 58-125286

[51] Int. Cl.⁴ ............................. B60K 23/00
[52] U.S. Cl. ........................ 180/78; 74/498
[58] Field of Search ............ 180/78; 74/484 R, 498

[56] References Cited

U.S. PATENT DOCUMENTS 4,409,584 10/1983 Arima et al. .................... 180/78

FOREIGN PATENT DOCUMENTS 49-17167 4/1974 Japan.
110542 7/1982 Japan ...................... 180/78

Primary Examiner—Magdalen Y. C. Moy
Attorney, Agent, or Firm—Cushman, Darby & Cushman

[57] ABSTRACT

A relay arrangement for transmitting electrical signals from various switches of an automobile to various devices controlled by the switches comprises a cable, and a boss plate rotatably held to the steering shaft of the automobile. The cable has a spiral winding between two sun gears, and the boss plate extends between two neighboring turns of the winding. The number of turns of the winding is in excess of the maximum number of revolutions that the steering wheel can make. When the boss plate is rotated during the rotation of the steering wheel, the plate slides through the winding in a plane perpendicular to the axis of the winding.

6 Claims, 12 Drawing Figures

RELAY ARRANGEMENT FOR STEERING WHEEL

FIELD OF THE INVENTION

The present invention relates to a steering wheel in which the pad does not rotate when the wheel is operated and, more particularly, to a relay arrangement which is used with such a steering wheel to transmit electrical signals from various switches, indicators, or the like incorporated in the pad to a column.

BACKGROUND OF THE INVENTION

An example of this kind of relay arrangement has been already proposed by the assignee of the present application in Sugita et al, U.S. patent application Ser. No. 583,266 filed Feb. 24, 1984. This proposed arrangement is shown in FIGS. 1 and 2, where a flat cable 1 in the form of a ribbon is wound such that two spirals 2 are formed at two intermediate positions. The cable 1 is so arranged that the spirals 2 are incorporated in a sun gear 3 on the side of a column and a sun gear 4 on the side of a pad, respectively, to constitute a relay means. In this device, the number of turns of each spiral 2 is required to be in excess of the maximum number of revolutions that the associated steering wheel can make (substantially more than twice this maximum number) in order to absorb the rotation of the steering wheel. This makes the cable 1 long, increasing the cost.

SUMMARY OF THE INVENTION

It is one object of the present invention to provide an improved relay arrangement which is used for a steering wheel and which needs a short cable for transmitting signals, is simple in structure, and is economical to manufacture.

The above and additional objects are achieved in accordance with the present invention by a relay arrangement for a steering wheel, the arrangement comprising: a cable for transmitting signals; a boss plate over which the cable passes at intermediate positions of the cable; and sun gears on the column side and on the pad side, respectively; the cable having a spiral winding which is disposed between the sun gears and the number of turns of which is in excess of the maximum number of revolutions that the steering wheel can make.

DETAILED DESCRIPTION OF THE INVENTION

Figure 1:
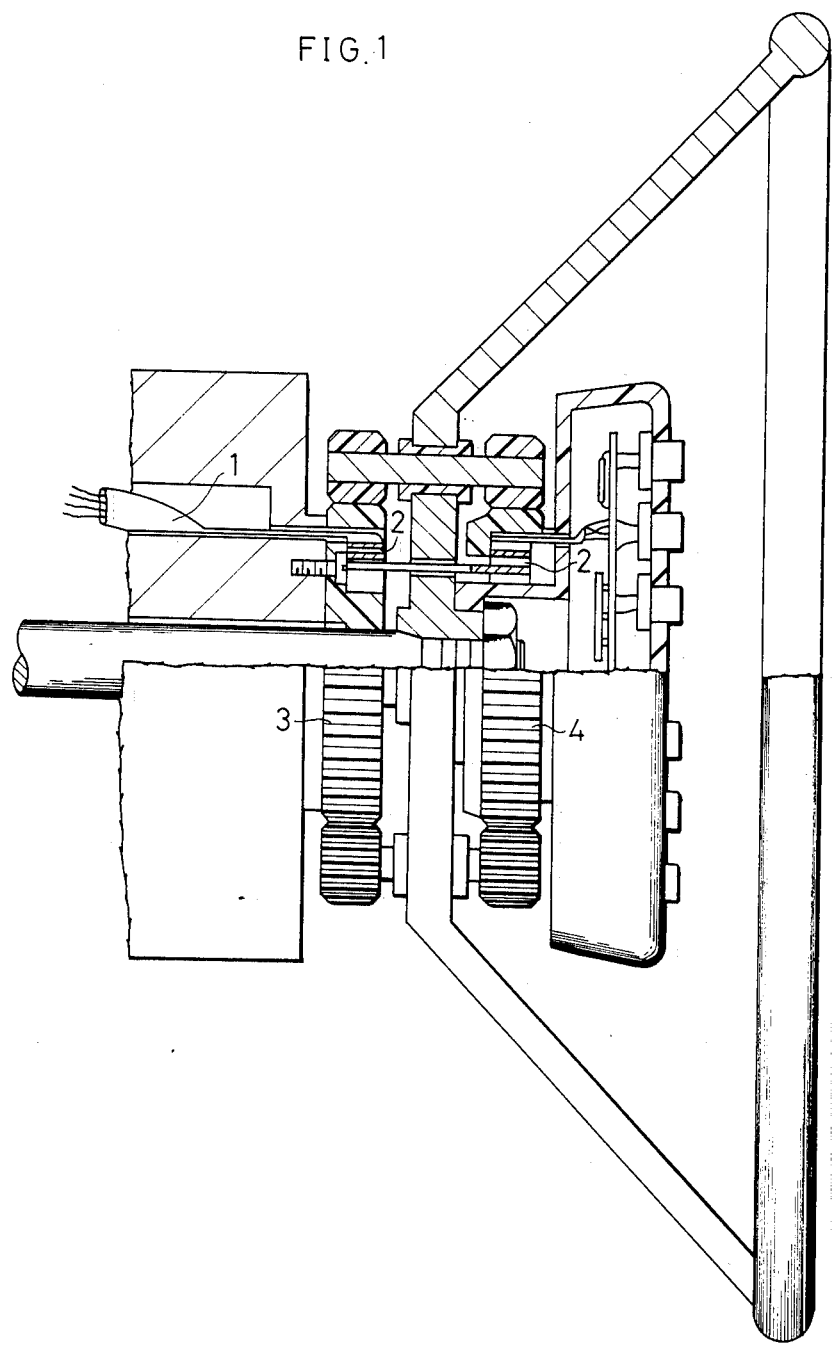
FIG. 1 is a partially cut-away side elevation of a steering wheel using the relay means associated with the present invention.
Figure 2:
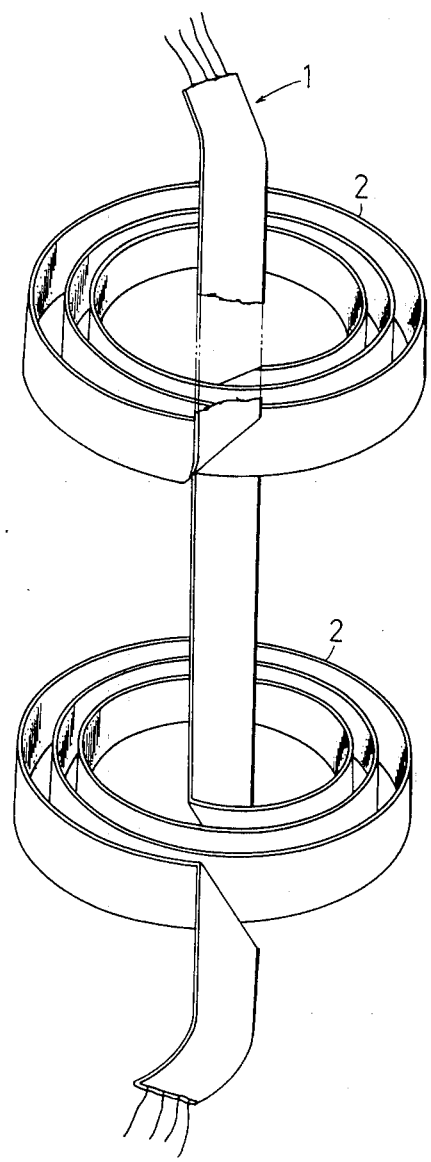
FIG. 2 is a perspective view of a part of the relay means shown in FIG. 1.
Figure 4:
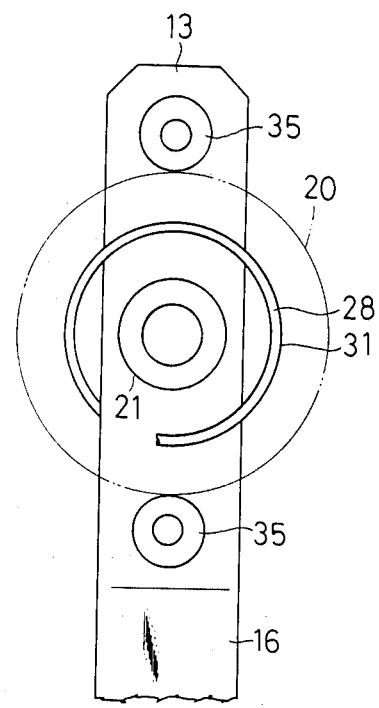
FIG. 4 is a front elevation of the main portion of the relay arrangement shown in FIG. 3, for showing the inner structure of the arrangement.
Figure 5:
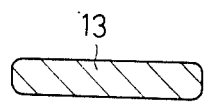
FIG. 5 is a cross-sectional view of the boss plate of the relay arrangement shown in FIG. 3.

Referring first to FIGS. 3-8, there is shown a relay arrangement embodying the concept of the present invention. Indicated by reference numeral 11 is an automotive column through which a steering shaft 12 extends. A slender boss plate 13 is secured to one end of the shaft 12 by tightening a nut 14. As shown in FIG. 5, the corners on opposite sides of the plate 13 are rounded. A ring 15 which acts to operate the steering wheel is supported by one spoke 16 extending from the boss plate 13.

A sun gear 17 on the column side is made from a synthetic resin, and is fixed to the column 11 by means of a plurality of bolts 18. The aforementioned steering shaft 12 extends through the center of the sun gear 17. A cylindrical sleeve 19 protrudes from the front end of the sun gear 17. The boss plate 13 is centrally provided with a projection 21 to which a sun gear 20 on the pad side is rotatably mounted by the use of a bearing 22. The sun gear 20 is also made from a synthetic resin, and comprises the same number of teeth as the sun gear 17 on the column side. A cylindrical sleeve 23 protrudes from the rear end of the sun gear 20 on the pad side.

Mounted to the sun gear 20 by a plurality of bolts 25 is a pad 24, and switches for an automobile horn, a radio, headlights, a cruise control system, etc. are mounted on the front side of the pad. A printed circuit board 27 which is housed and retained within the pad 24 is connected to the switches 26. The circuit board 27 is capable of multiplexing various electrical signals from the switches 26.

Figure 6:
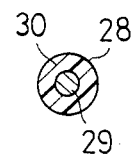
FIG. 6 is a cross-sectional view of the cable for transmitting signals of the relay arrangement shown in FIG. 3.
Figure 3:
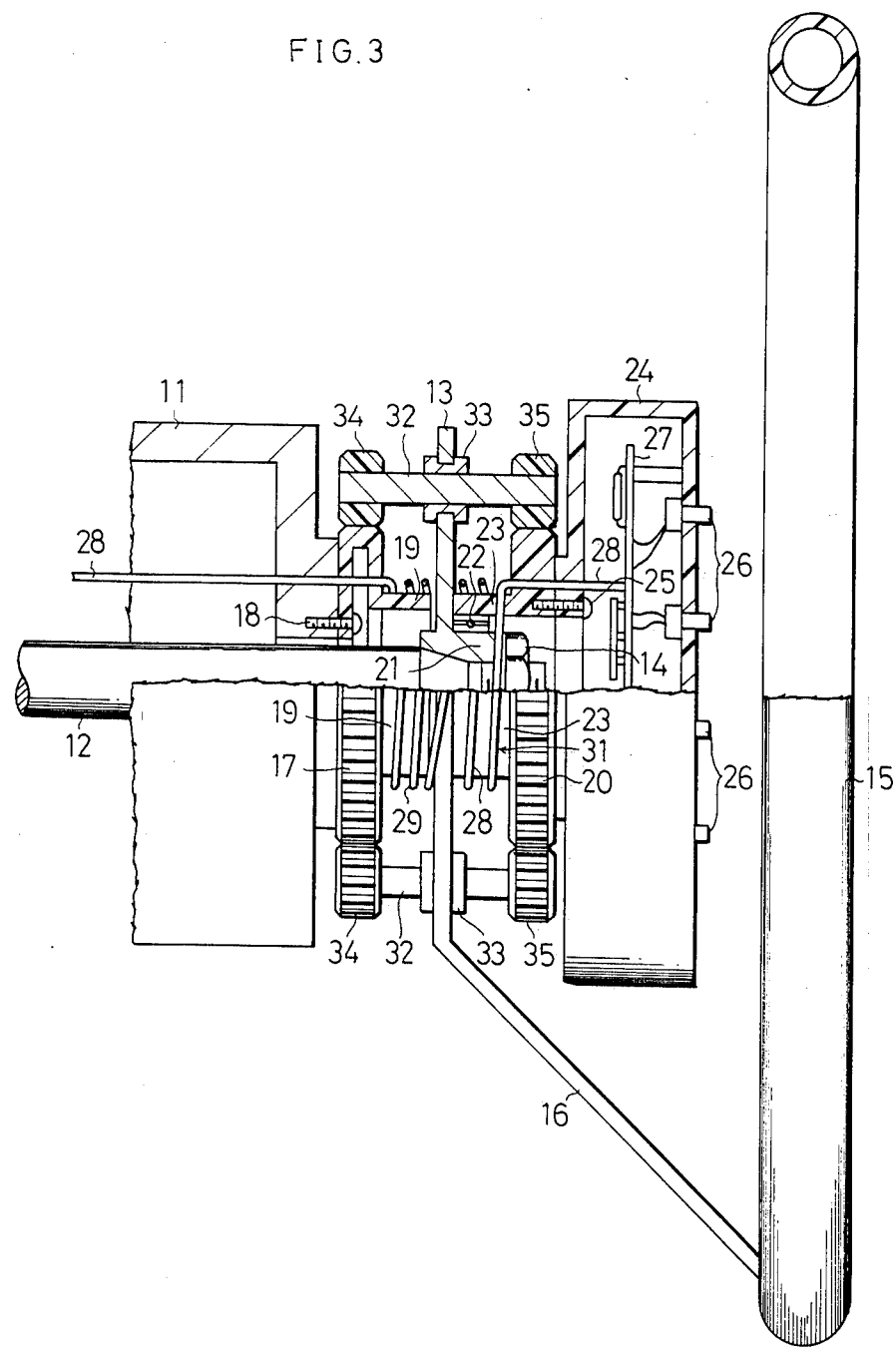
FIG. 3 is a partially cut-away side elevation of a steering wheel using a relay arrangement according to the present invention.

A cable 28 for transmitting the multiplexed signals has one end connected to the circuit board 27, and consists of one or more cores 29 and a protective coating 30 surrounding the cores, as shown in FIG. 6. The cores 29 is made from an electrically conductive material that exhibits resilience. The coating 30 is made from Teflon or other resin, which is excellent in wear resistance and has a low friction coefficient. The cable 28 extends through both the back side of the pad 24 and the sun gear 20 on the pad side, and is loosely wound on somewhat outer portions of the sleeves 19 and 23 with a certain number of turns that is larger by one or two than the maximum number of revolutions that the steering wheel can make, in order to form a spiral winding 31. When the steering wheel is in its neutral condition, i.e., the automobile is moving straight, the boss plate 13 passes through the center of the winding 31 in a plane perpendicular to the axis of the winding, as shown in FIGS. 3 and 4. Accordingly, in this example, the opposite ends of the boss plate 13 extend out from the winding 31 of the cable 28 in diametrically opposite directions.

The cable 28 further extends through both the sun gear 17 on the column side and one end of the column 11, extends within the column 11, and is connected to various devices including the horn, radio, headlights, and cruise control system. The cable 28 constitutes the loose winding 31 having the requisite number of turns between the sun gears 17 and 20 so as not to interfere with the rotation of the boss plate 13 when it is slided through the winding 31 of the cable 28.

Two cable shafts 32 extend in opposite directions from the outer periphery of the boss plate 13, and planet gears 34 and 35 are securely fixed to the opposite ends of their respective shafts 32. The gears 34 and 35 on the column side and on the pad side, respectively, have the same number of teeth and are in mesh with the sun gears 17 and 20 on the column side and on the pad side, respectively. These gears 34 and 35 made from a synthetic resin turn on their own axes and, at the same time, make a revolution around their respective sun gears 17 and 20. A bearing 33 made from a resin, such as polyacetal, is mounted to the boss plate 13, and acts as a sliding bearing that supports the shafts 32 such that the shafts can be rotatable.

In the operation of the arrangement constructed as thus far described, when the ring 15 is rotated to operate the steering wheel, the boss plate 13 is rotated. Thus, the planet gears 34 and 35 secured to their respective shafts 32 make a revolution around their respective sun gears 17 and 20 while revolving on their own axes. As such, the sun gear 20 on the pad side and the pad 24 do not rotate relative to the column 11 in the same manner as the sun gear 17 on the column side.

Figure 7:
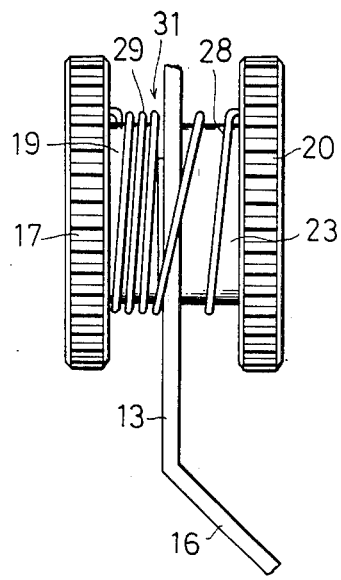
FIGS. 7 and 8 are side elevations of the main portions of relay arrangement shown in FIG. 3, for illustrating its operation.
Figure 8:
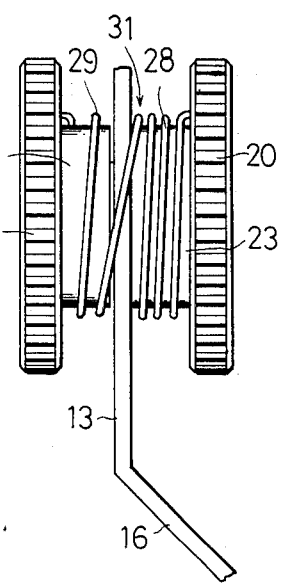

At this time, the rotation of the boss plate 13 will not be impeded by the cable 28, because the boss plate 13 slides between two neighboring turns of the winding 31 of the cable 28. That is, when the ring 15 is angularly moved to the right from its neutral position, the boss plate 13 slides between two neighboring turns of the winding 31 of the cable and pushes the cable 28 toward the column, as shown in FIG. 7. On the other hand, when the ring 15 is angularly moved to the left, the boss plate 13 makes a similar sliding movement and urges the cable 28 toward the pad as shown in FIG. 8.

During the sliding movement of the boss plate 13, the cable 28 makes contact with the aforementioned rounded corners of the plate. Further, the surface of the cable 28 consists of the protective coating 30 that is excellent in wear resistance and has a low friction coefficient. Therefore, the boss plate 13 experiences only a small resistance in sliding through the winding of the cable 28. Also, the cores 29 of the cable 28 are sufficiently protected by the protective coating 30. In addition, because of the resilience of the cores 29, the winding 31 of the cable 28 urges the boss plate 13 into its neutral position shown in FIG. 3 whenever the winding 31 is stretched as shown in FIGS. 7 and 8.

Because the cable 28 does not impede the rotation of the boss plate 13, and because it is not damaged by the plate, as mentioned previously, the signals from the switches 26 in the pad 24 are certainly transmitted through the cable 28 to the devices including the horn installed on the side of the column 11. Since the total number of turns on the winding 31 is only slightly greater than the maximum number of revolutions that the steering wheel can make, the length of the cable 28 can be made about or less than half that of the cable in the related device previously mentioned. Hence, the novel structure is simple and cheap.

Figure 9:
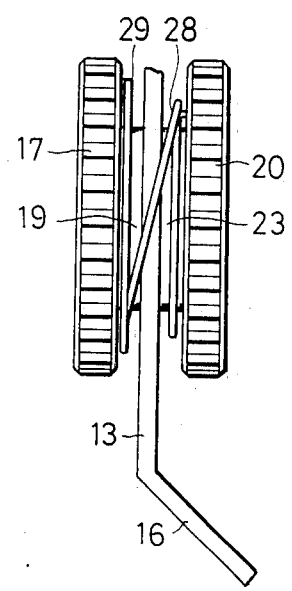
FIG. 9 is a side elevation of the main portion of a steering wheel using another relay arrangement according to the present invention.
Figure 10:
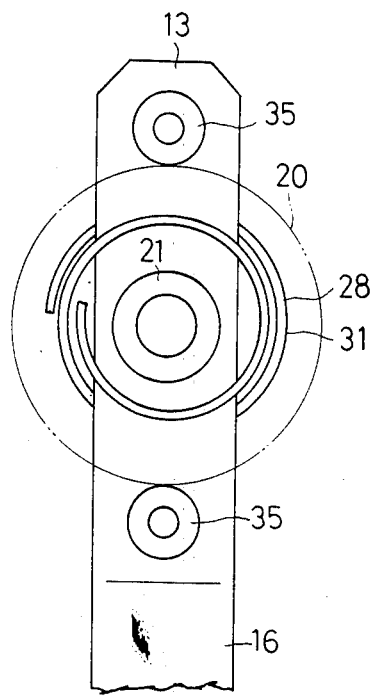
FIG. 10 is a front elevation of the main portion of the relay arrangement shown in FIG. 9.

Referring next to FIGS. 9 and 10, there is shown another relay arrangement according to the invention. This arrangement is similar to the aforementioned arrangement except that the winding 31 of the cable 28 is a coil that is lap wound to limit its dimension in the direction of the axis of the steering shaft 12. This second example of arrangement yields the same advantages as the arrangement first described. In addition, it can contribute to compactness of the steering wheel, because the gap between the sun gears 17 and 20 in which the winding 31 is received can be reduced.

Figure 11:
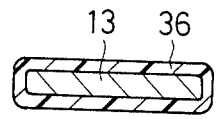
FIG. 11 is a cross-sectional view of an example of boss plate differing from those in the aforementioned embodiments.

It is to be understood that the present invention is not limited to the structures of the foregoing embodiments, but rather the following modifications may also be made:

(1) As shown in FIG. 11, the boss plate 13 is entirely coated with a coating layer 36 of a resin, such as Teflon, which is excellent in wear resistance and has a low friction coefficient, in order to further reduce the resistance that occurs when the boss plate 13 slides through the winding of the cable 28.

Figure 12:
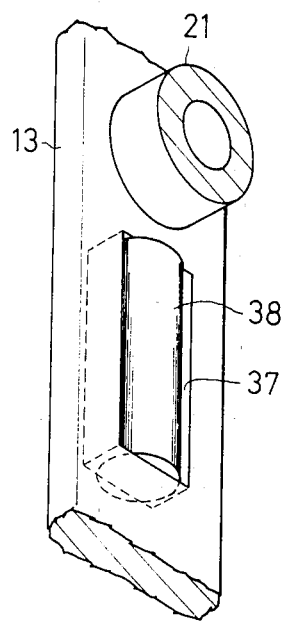
FIG. 12 is a perspective view of the main portion of a still other example of boss plate.

(2) As shown in FIG. 12, the portion of the boss plate 13 over which the winding 31 of the cable 28 passes is provided with a hole 37 extending through it. A roller 38 made from rubber, a synthetic resin, or the like is rotatably mounted in the hole 37 in such a way that the roller projects outwardly from the hole 37 on both sides. The roller 38 rotates and moves between two neighboring turns of the winding 31 of the cable 28 while its projecting portions are in contact with the cable, thereby decreasing the abrasion of the cable 28 further.

(3) It is only necessary that the number of turns of the winding 31 is greater than the maximum number of revolutions that the steering wheel can make.

(4) The winding 31 can assume various helical forms when viewed from the front, depending on the size of the pad 24, other dimension, shape of the planetary gear trains, or other factors. For example, the winding may be helical in shape that is an ellipse, triangle whose corners are rounded, or rectangle whose corners are rounded when viewed from the front.

(5) The cores 29 of the cables 28 are plural in number and independent of one another.

As described in detail hereinbefore, the present invention resides in providing a relay arrangement for a steering wheel, the arrangement comprising: a cable for transmitting signals; a boss plate over which the cable passes at intermediate positions of the plate; and a sun gear on the column side and a sun gear on the pad side; the cable having a spiral winding which is disposed between the sun gears and the number of turns of which is in excess of the maximum number of revolutions that the steering wheel can make. Hence, the cable can be made short. Further, the structure is simple and economical to manufacture.

What is claimed is:

1. A relay arrangement for a steering wheel, the arrangement comprising:
  (a) a stationary column;
  (b) a steering shaft rotatably supported in said stationary column;
  (c) a boss plate attached to said steering shaft;
  (d) a steering ring supported by at least one spoke on said boss plate;
  (e) a pair of first and second sun gears disposed axially one on each side of said boss plate, respectively, said second sun gear being fixed to said stationary column;

(f) a pad attached to said first sun gear remotely from said boss plate and supporting at least one switch for controlling electric accessories;
(g) at least one planet gear shaft rotatably supported on said boss plate;
(h) at least a pair of first and second planet gears mounted on ends of said planet gear shaft and held in mesh with said first and second sun gears, respectively, whereby said pad can be kept stationary during rotation of said steering ring and shaft;
(i) a cable for transmitting signals from said switch to the electric accessories, said cable having a spiral winding through which said boss plate extends;
(j) the winding being disposed between said first and second sun gears, the number of turns of the winding being in excess of the maximum number of revolutions that the steering wheel can make;
(k) the boss plate being constructed and arranged to slide between two neighboring turns of the winding, for pushing the cable towards the steering column and the pad.

2. A relay arrangement for a steering wheel as set forth in claim 1, wherein the cable has a protective coating, which is excellent in wear resistance and has a low friction coefficient.

3. A relay arrangement for a steering wheel as set forth in claim 1, wherein the spiral winding of the cable is a loose coil.

4. A relay arrangement for a steering wheel as set forth in claim 1, wherein the winding of the cable is a coil that is lap wound.

5. A relay arrangement for a steering wheel as set forth in claim 1, wherein the boss plate is entirely coated with a coating of a resin.

6. A relay arrangement for a steering wheel as set forth in claim 1, wherein the portion of the boss plate over which the winding of the cable passes is provided with a hole extending therethrough, and wherein a roller is rotatably mounted in the hole in such a way that the roller extends out from the hole on opposite sides.

* * * * *